United States Patent [19]

Myers

[11] Patent Number: 4,525,047

[45] Date of Patent: Jun. 25, 1985

[54] BURGLAR AND INTRUDER DETECTION SYSTEM

[76] Inventor: Harold P. Myers, S. Harding St., P.O. Box 46, Marquand, Mo. 63655

[21] Appl. No.: 365,542

[22] Filed: Apr. 5, 1982

[51] Int. Cl.³ .......................... G03B 17/46; G03B 1/12

[52] U.S. Cl. ........................................ 354/173; 354/81

[58] Field of Search ............... 354/81, 173.1; 352/242, 352/179

[56] References Cited

U.S. PATENT DOCUMENTS

| | | | |
|---|---|---|---|
| 2,679,186 | 5/1954 | Schulte | 352/179 |
| 2,718,628 | 9/1955 | Bartlett et al. | 352/179 X |
| 3,141,393 | 7/1964 | Platt | 354/81 |
| 3,752,047 | 8/1973 | Gordon et al. | 354/81 X |
| 4,180,316 | 12/1979 | Della-Calce | 354/173.1 |
| 4,383,744 | 5/1983 | O'Connell | 354/81 |

*Primary Examiner*—Donald A. Griffin

*Attorney, Agent, or Firm*—Kalish & Gilster

[57] ABSTRACT

A burglar and intruder detection system photographs burglars and other intruders by use of a mechanically trippable camera of the automatic advance type for sequentially taking successive pictures upon being repeatedly tripped. An electric motor drives a shaft having a cam. A lever arrangement is actuated by cam lobes to repeatedly trip the camera when the motor operates. Electric power for motor operation is provided by a switch mat or other switching device in response to detection of the presence of an intruder. A thread follower on the shaft establishes a predetermined time interval following the initiation of motor operation, operating a switching device for de-energizing the motor after the interval is timed out. An enclosure having a movable cover protects the camera and associated lighting. Solenoids control movement of the cover.

10 Claims, 2 Drawing Figures

BURGLAR AND INTRUDER DETECTION SYSTEM

BACKGROUND AND SUMMARY OF THE INVENTION

The present invention relates to systems for detecting burglars and other intruders and, more particularly, a system of a concealed, protected nature for photographing and surprising such intruders.

Heretofore, it has been known to photograph an area of surveillance from an obscured or at least partially concealed position. The use of television cameras is a more recent development, permitting continuous or periodic surveillance of an area to be carried out by a strategic location of a television camera. Typical of arrangements for such surveillance may be found in U.S. Pat. Nos. 3,819,856; 3,916,097; 4,080,629; 4,160,999 and 4,225,881. However, there is often a deterrent effect of mounting a television camera in prominent view, since it may deter thievery or shoplifting because of the impression that one is being watched by the camera. It may not be advantageous, therefore, for the television camera to be located in a concealed location.

In the field of banking, the use of cameras for taking the picture of those entering or leaving banking facilities, or at a teller's window, is an old expedient, and the camera may not be concealed, but may be actuated remotely, as by a till switch, as typified by U.S. Pat. No. 3,309,976. However, for photographing after-hours intruders, concealment of a camera may be advantageous. U.S. Pat. No. 4,180,316 represents the type of arrangement where a camera is mounted within a concealed enclosure. The apparatus disclosed in that patent is actuated remotely by a radio transmitter, as when an individual enters the area of surveillance. Another radio remote control system for operating a camera from the transmitter is to be found in U.S. Pat. No. 3,686,672. Yet another arrangement utilizing a camera for photographing an intruder is proposed in the earlier U.S. Pat. No. 2,109,361, describing an arrangement for taking a picture by a still camera and then dropping the camera out of sight by a chute which delivers the camera to a secured location.

For effective photography, the area of surveillance must be illuminated. If floodlights, spotlights, photoflood lights and the like are provided, their obvious presence would invite an intruder to disable them before being photographed and take other steps to avoid detection and being photographed. But, if one were to install the camera and photoflood or other bright lights behind an enclosure, there would be a risk of fire if the hot bright lights should somehow be illuminated while concealed, as by a cover. In any event, surprise is essential in effectively photographing a burglar or other intruder. And it may also be desirable to once more safely enclose the photography apparatus after taking pictures of the intruder so that access cannot be readily gained to the camera by the intruder, who might otherwise attempt to destroy the camera or attempt to take its film.

Accordingly, an object of the invention is the provision of a system for photographing any sort of intruder, such as a burglar, and for sequentially taking a plurality of successive pictures of an area under surveillance once there has been an intrusion into the area, whereby it will be possible to obtain various pictures of the intruder as he endeavors to escape, seize property, and so forth.

A further object is the provision of such a system which provides concealment and protective enclosure of not only a camera but also the lighting by which the protected area is to be illuminated for picture taking.

Another object of the invention is the provision of such a system which opens an enclosure for the camera and lighting equipment to allow taking of a number of pictures successively, and then upon completion of the picture taking once more closes the enclosure to obscure and protect the camera and lighting apparatus.

A further object of the invention is the provision of such a system which precludes operation of the lighting equipment such as photoflood lamps, unless the protective enclosure has first opened, for protecting against the hazard of fire or other damage which might occur if the light source were turned on within the enclosure while it remains closed.

It is also an object of the invention to provide such a system which allows the taking of a predetermined number of successive pictures and, upon completion of the last picture, reliably acts to terminate the various functions of the system in a safe, failure-free manner.

Among other objects of the invention are the provision of such a system which actuates suddenly to provide both light and sound to frighten and scare away an intruder before further damage or theft can occur; which provides precise timing of the interval between successive pictures; which is of a mechanically simple and effective design; and which can be easily armed for use as well as easily reset after use.

Other objects and features will be in part apparent and in part pointed out hereinbelow.

DESCRIPTION OF THE PREFERRED EMBODIMENT

Figure 1:
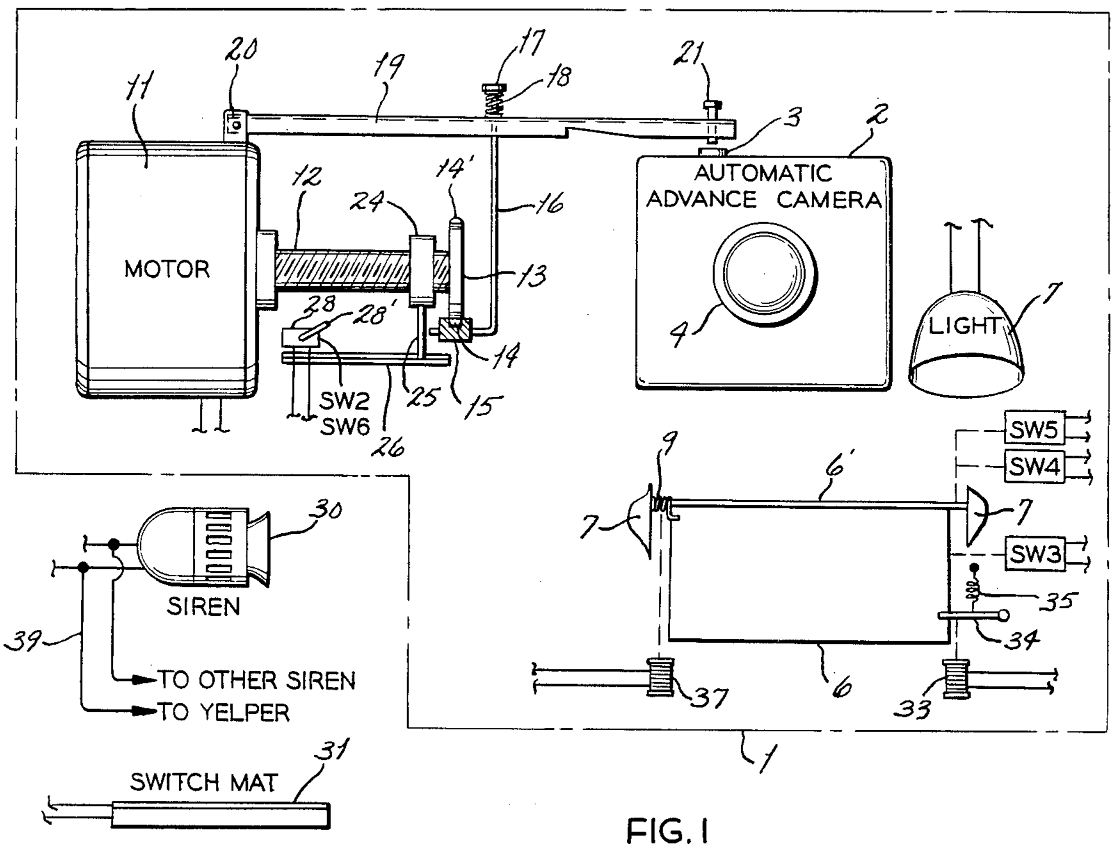
FIG. 1 is a partly schematic, partly pictorial illustration of a burglar and intruder detection system in accordance with and embodying the present invention.

Referring now to the drawings, reference numeral 1 generally indicates a suitable enclosure in which is located various elements of a system of the invention, including an automatic advance camera 2, which may be any of a variety of mechanically trippable cameras of the automatic advance type for sequentially taking a plurality of successive pictures upon being repeatedly tripped. For example, the camera may have a spring wind mechanism or self-contained battery and drive components which automatically advance the film each time a trip release button 3 is pressed. The camera is mounted in any suitable manner so that its lens 4 is focused upon an area under surveillance, such as the interior of a dwelling, a hallway, a place of business, or the like.

One preferred construction for enclosure 1 is a cabinet or similar woodwork portion of a dwelling. The enclosure is provided with a suitable cover 6 which, in accordance with the invention, can be opened to permit the taking of pictures by camera 2.

Also preferably located within enclosure 1 is a photoflood light 7 or any of a variety of different possible high intensity lights which will brightly illuminate the area under surveillance when cover 6 is opened. FIG. 1 is not drawn to scale so that it will be appreciated that cover 6 is merely representative of any suitable cover that can be suitably mounted upon enclosure 1 for allowing the taking of pictures and for allowing light from source 7 to be aimed outwardly from the enclosure into the area of surveillance. For concealment purposes, cover 6 may appear to be merely a cabinet door.

Where enclosure 1 is a cabinet, it can be mounted at a relatively high location within a room so that upon the cover 6 swinging open, light will be directed down into the room to brightly illuminate a wide area of the room as well as to surprise and scare any intruder, such as a burglar in the act of breaking in, by the overwhelming brightness and relatively high location of the light which may be temporarily blinding to the intruder so that he will be even unlikely to move for a few moments, enhancing the potential for obtaining multiple good photographs of him.

Also, FIG. 1 is not intended to convey a particularly preferred pivot arrangement for cover 6, as such is subject to variation dependent upon the installation preferred by the user. However, for purposes of illustration, cover 6 is represented as having its opposite sides or ends pivoted to structure, as at 7, 7', of enclosure 1. For example, cover 6 may swing upwardly, being aided by a spring 9, to permit the taking of pictures and illumination of the premises, or it may swing down or to the side.

Mounted in relative adjacency to camera 2 is a motor 11 for being powered by conventional A.C. voltage, such as available in a home. Motor 11 is of the timing type having an output shaft 12 which rotates at a relatively low angular velocity such as preferably one revolution every four seconds. Carried at the outward end of shaft 12 is a cam 13 having two lobes 14, 14', each of which will cause movement of a recessed cam follower arm 15 which is connected to an actuating link 16. Arm 16 is interconnected adjustably by means of an adjustment lock screw 17 and spring 18 with a main trip actuating arm 19. The latter has one end pivotally mounted, as at 20. The other end is presented for contacting the trip button 3 of camera 2, by means of an adjustment screw 21. Thus, both elements 16, 19 are pivotally or rockably mounted for movement in response to the rotation of cam 13, so that each rotation of the cam will produce two actuations of the camera trip button 3, resulting in the taking of pictures at periodic intervals, e.g., every two seconds. Elements 16, 19 are transverse to one another.

The motor output shaft 12 is threaded and carries a timing collar 24 which is threaded onto shaft 12. Collar 24 includes a stem 25 which extends radially outwardly from motor shaft 12 for engaging a guide bar or groove 26 to prevent rotation of collar 24 as the motor shaft turns, the threading being such as to cause movement of collar 24 toward the motor as the motor shaft turns in its normal direction. Mounted adjacent to guide 26 is a switch device 28 having an actuating handle 28' for being contacted by stem 25 when the collar approaches the housing of motor 11. The switch device 28 actually contains plural switching sections as will be evident from the following description.

The system further includes a siren 30 or other loud audible warning signal such as a yelper, horn, klaxon, bell, etc. which may be mounted anywhere, including within the enclosure, for being heard by the intruder. Although not shown, an additional siren or yelper, etc. may be mounted outside of the dwelling or place of business for alerting neighbors, police and others to detection operation of the system.

For initiating operation of the system, there is provided a switch mat 31 which will be stepped upon when the burglar or other intruder enters the area under surveillance, the switch mat providing electrical power for initiating operation of motor 11 and other functions of the system upon the intruder entering the premises. Other detection devices may be used instead, such as photoelectric devices, ultrasonic detectors, proximity detectors, and so forth, but providing, in any event, the requisite switching of electrical power for initiating operation of the system when the presence of an intruder is detected.

Various arrangements for opening of cover 6 are possible within the scope of the invention, but the system includes at least driving means for permitting movement of the cover between its closed and open positions in response to actuation of the system. For this purpose, solenoids may be utilized, there being a first solenoid 33 having its armature connected to a latch 34 which normally retains cover 6 in its closed position in which camera 2, motor 11, light 7, and other apparatus of the system will be concealed from view and will deny access of the system to the burglar or other intruder who might wish to disable the system. When solenoid 33 is energized, a latch 34 normally held in place by spring 35 will move out of the way to permit cover 6 to swing open under the influence of spring 9. Another solenoid 37 has its armature suitably connected with cover 6 for causing the cover to be moved to its closed position after pictures have been taken by the system.

Figure 2:
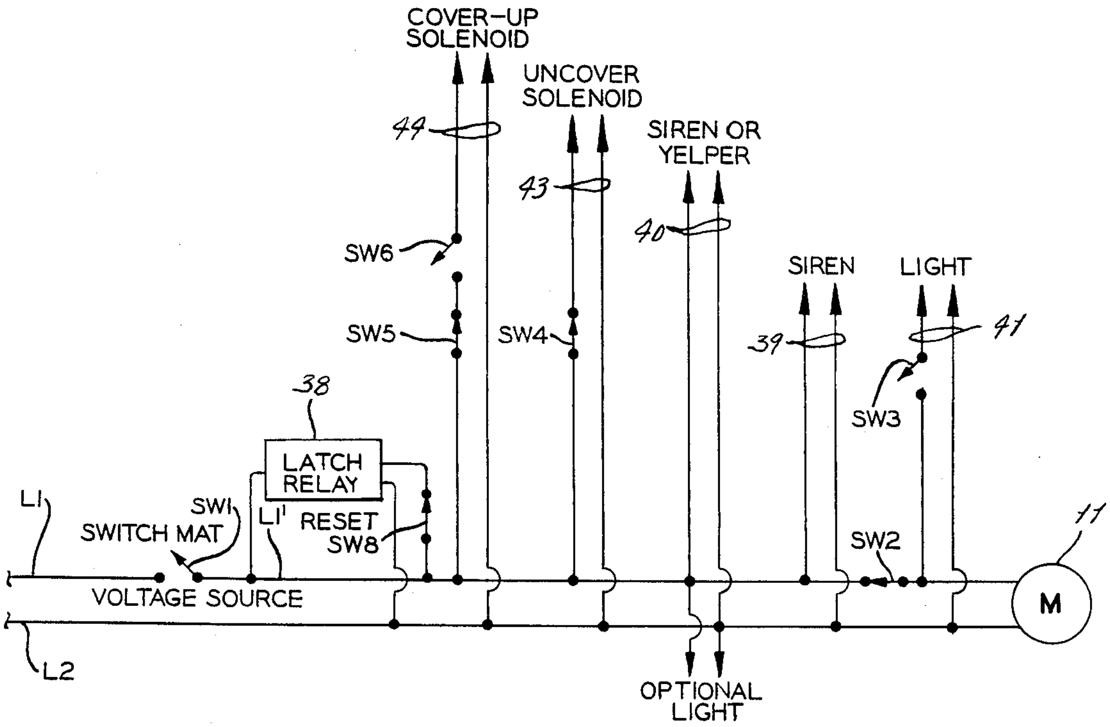
FIG. 2 is a schematic diagram of the electrical circuitry of the system.

Referring to FIG. 2, a switch SW1 is shown connected in one of a pair of leads L1, L2 by which electrical power, such as 115 V.A.C., is supplied. Switch SW1 represents the switching elements of switch mat 31. When weight of an intruder is sensed by mat 31, SW1 closes so that the power is provided across leads L1', L2. Lead L2 supplies one side of the power connection to motor 11, while lead L1' provides the other connection to the motor for operation through switch SW2 of the normally closed (n.c.) type. Switch SW2 is but one of the switch sections of switch device 28 and will be opened when stem 25 contacts actuator 28'. As shown in FIG. 2, SW2 thus normally permits power to be supplied to motor 11 when SW1 of the switch mat 31 is closed by an intruder. To maintain voltage across leads L1', L2, a latch relay 38 may optionally be employed, thus maintaining a connection between leads L1 and L1' even if the intruder should move off the switch mat. Relay 38 may be reset by opening SW8 which is of the n.c. type.

Upon the provision of voltage across L1', L2 by closure of SW1, voltage is applied across a pair of leads 39 to siren 30 and, if an external siren or yelper is employed, across a pair of leads 40 for actuating that device. Accordingly, the intruder will be immediately alarmed by siren 39, and any external siren or yelper connected by leads 40 will summon aid or the police, etc.

Light 7 is also connected by a pair of leads 41, one of which includes a switch SW3 of the normally open (n.o.) type. This switch, referred to in FIG. 1, is suitably interconnected with cover 6 whereby SW3 will close only upon opening of cover 6. This will preclude light 7 from being turned on within the confines of enclosure 1 until the light can be shone through the opening of cover 6. Otherwise, the bright high-intensity photoflood type of device could cause excess heating and even present the possibility of fire. Cover 6 is caused to be swung open by the energization of the uncover solenoid 33, which is connected across a pair of leads 43, one of which includes n.c. switch SW4. When energized, solenoid 33 releases latch 34 to permit cover 6 to spring open under the influence of spring 9. When the cover opens, SW4 opens to de-energize solenoid 33.

Having been provided with electrical power, motor 11 turns shaft 12. The lobes of cam 13, by contacting arm 16, cause arm 19 to periodically depress trip button 3 of camera 2. Each time button 3 is depressed, the camera will take a picture and then automatically advance to the next film position. Therefore, if the intruder is moving around the room or attempting to flee, the camera will nevertheless take successive pictures, thus enhancing the potential for obtaining a picture of the intruder from various different angles and positions which will, of course, aid in the capture.

The threaded shaft 12 of motor 11 causes movement of thread follower 24 over a fixed distance, until contacting actuator 28'. Since the motor is turning at a constant speed, travel of follower 24 over this fixed distance will occur in a predetermined time interval following initiation of motor operation by closing of switch SW1. When stem 25 contacts actuator 28', switch SW2 is opened and a further set of n.o. switch contacts SW6 within switch device 28 will close. SW6 is connected in one of a pair of leads 44 which provide power to cover-up solenoid 37. The lead containing SW6 also contains n.c. switch SW5, which is suitably interconnected with door 6 for being caused to open when cover 6 is in its closed position, it being understood that SW5 will close upon opening of door 6 by energizing of solenoid 33. When both SW5 and SW6 are closed, solenoid 37 is energized, causing cover 6 to return to its closed position. When it closes, SW6 opens to remove power to solenoid 37. Finally, SW3 also opens to turn off light 7.

According to this preferred mode of operation, cover 6 is thus returned to a closed position when the camera has taken a predetermined number of pictures, light 7 is turned off, and the camera is once more rendered inaccessible to the intruder. However, the inside yelper or siren 30 will continue to sound until the system is reset by opening of SW8 by the owner or authorized person. Of course, if desired, another light can be connected across leads L1', L2, as indicated, and will remain on until reset switch SW8 is operated.

It will be appreciated that the system provides, therefore, entirely automatic operation of a fail-safe character, as well as providing protection against the possibility that components of the system would remain energized and thus produce fire hazard or the risk of component damage once the system has been actuated. However, the sirens or yelpers will remain on (together with any optional lighting) to provide continued warning of the fact that intrusion has taken place as well as to deter a burglar from continuing to take property, etc.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. A burglar and intruder detection system for photographing burglars and other intruders, said system comprising a mechanically trippable camera of the automatic advance type for sequentially taking a plurality of successive pictures upon being repeatedly tripped, an electric motor, a shaft for being rotatably driven by the motor, the shaft having a cam presenting at least one lobe, trip means actuatable by the cam lobe for repeatedly tripping the camera upon operation of the motor, first electric switching means for providing electric power for initiating operation of the motor in response to detection of the presence of an intruder, delay means driven by the shaft for establishing a predetermined time interval following the initiation of motor operation, second electric switching means operable in response to the delay means for de-energizing the motor after the predetermined time interval, and concealment means for concealing and protecting the camera including an enclosure for the camera, electric motor and shaft, and a cover movable between enclosed positions concealing and an open position uncovering said camera for picture taking, means for driving said cover between said positions, said driving means moving said cover to its closed position in response to operation of the second switching means.

2. A burglar and intruder detection system according to claim 1 and further characterized by the driving means including first solenoid means for being energized in response to operation of the first switching means for opening the cover, and second solenoid means responsive to operation of said second switching means for closing the cover.

3. A burglar and intruder detection system according to claim 2 and further characterized by a light for illuminating an area in which the camera will take pictures, the light being normally concealed by the cover, and interlocked switching means for turning on the light only upon opening of the cover.

4. A burglar and intruder detection system according to claim 3 and further characterized by an electrically actuated sound generating device for being energized by the first electric switching means whereby an audible warning signal is emitted also in response to detection of the presence of an intruder.

5. A burglar and intruder detection system according to claim 2 and further characterized by a latch for maintaining the cover in a closed position, spring means for biasing the cover to an open position, said second solenoid when energized releasing the latch whereby the cover is driven by the spring means to its open position.

6. A burglar and intruder detection system according to claim 5 further characterized by said second solenoid means being connected to the cover for causing, when energized, movement of the cover to a closed position.

7. A burglar and intruder detection system for photographing burglars and other intruders, said system comprising a mechanically trippable camera of the automatic advance type for sequentially taking a plurality of successive pictures upon being repeatedly tripped, an electric motor, a shaft for being rotatably driven by the motor, the shaft having a cam presenting at least one lobe, trip means actuatable by the cam lobe for repeatedly tripping the camera upon operation of the motor, first electric switching means for providing electric power for initiating operation of the motor in response to detection of the presence of an intruder, delay means driven by the shaft for establishing a predetermined time interval following the initiation of motor operation, second electrical switching means operable in response to the delay means for de-energizing the motor after the predetermined time interval, and concealment means for concealing and protecting the camera, the motor shaft being threaded, the delay means comprising a thread follower threaded on the motor shaft and movable along the motor shaft over a fixed distance by the thread follower occurring in said predetermined time interval.

8. A burglar and intruder detection system according to claim 7 and further characterized by said second electric switching means comprising a switch and switch actuator therefor located in proximity to the threaded motor shaft, the thread follower being configured for contacting the switch actuator at the end of said fixed distance.

9. A burglar and intruder detection system for photographing burglars and other intruders, said system comprising a mechanically trippable camera of the automatic advance type for sequentially taking a plurality of successive pictures upon being repeatedly tripped, an electric motor, a shaft for being rotatably driven by the motor, the shaft having a cam presenting at least one lobe, trip means actuatable by the cam lobe for repeatedly tripping the camera upon operation of the motor, first electric switching means for providing electric power for initiating operation of the motor in response to detection of the presence of an intruder, delay means driven by the shaft for establishing a predetermined time interval following the initiation of motor operation, second electrical switching means operable in response to the delay means for de-energizing the motor after the predetermined time interval, and concealment means for concealing and protecting the camera, the camera trip means comprising a first linkage element mounted for being movably contacted by the cam lobe, a second linkage element mounted for being movably engaged by the first linkage element each time the latter is contacted by the cam lobe, one end of the second linkage element including adjustable contact means for contacting a trip button of the camera, whereby the camera is tripped each time the first linkage element is contacted by the cam lobe.

10. A burglar and intruder detection system according to claim 9 and further characterized by said first linkage element being interconnected with said second linkage element by screw adjustment means for adjusting the relationship between the first linkage element and the second linkage element.

* * * * *